J. S. BAUGHMAN.
PULLEY ATTACHMENT FOR WHEELS.
APPLICATION FILED MAY 20, 1915.
1,181,285.
Patented May 2, 1916.
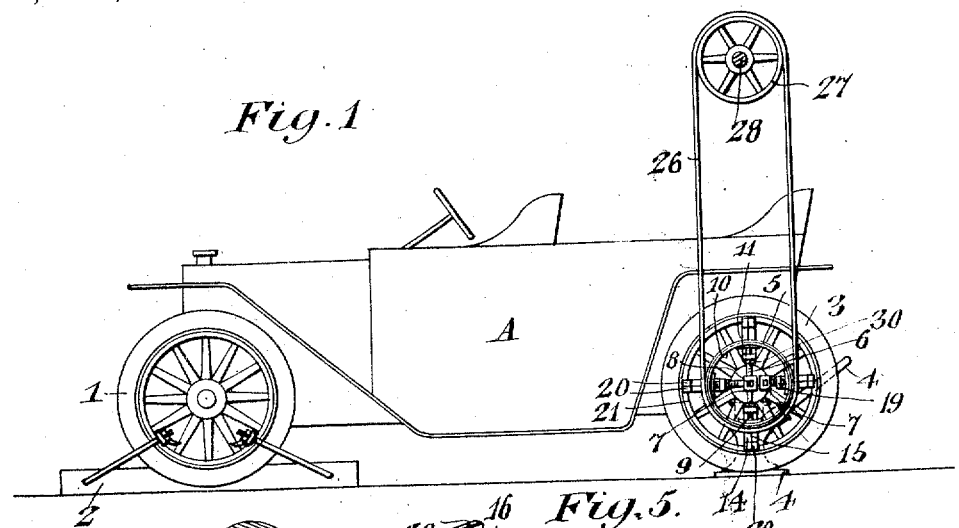
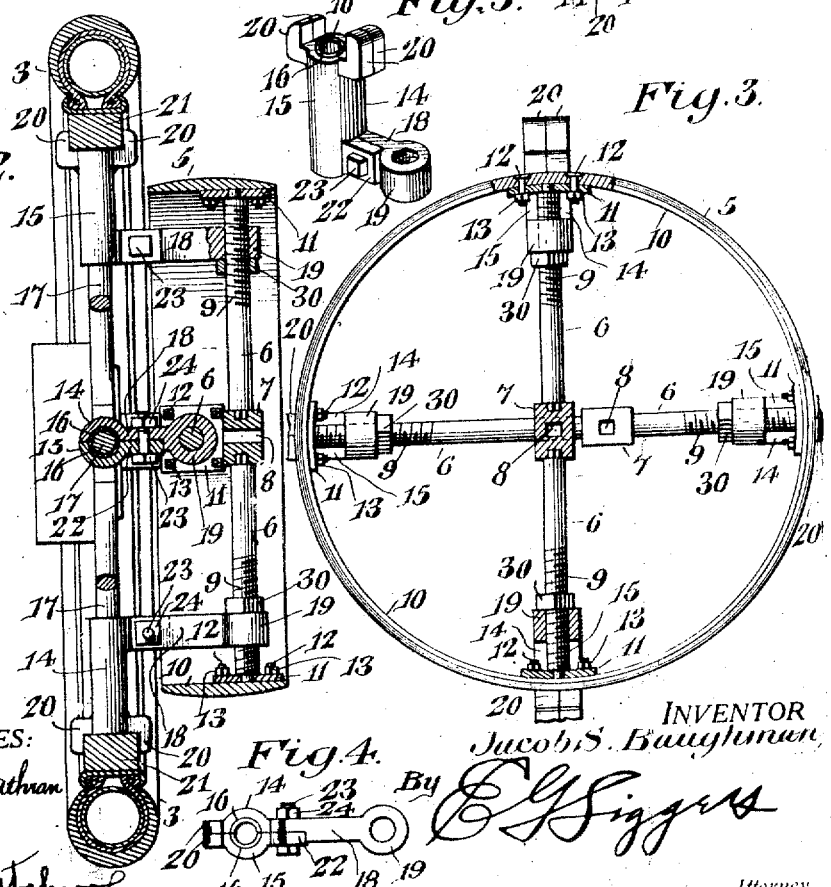
WITNESSES:
INVENTOR
Jacob S. Baughman
By
Attorney

UNITED STATES PATENT OFFICE.

JACOB SCHROCK BAUGHMAN, OF BURLINGTON, IOWA.

PULLEY ATTACHMENT FOR WHEELS.

1,181,285.

Specification of Letters Patent. Patented May 2, 1916.

Application filed May 20, 1915. Serial No. 29,376.

*To all whom it may concern:*

Be it known that I, JACOB S. BAUGHMAN, a citizen of the United States, residing at Burlington, in the county of Des Moines and State of Iowa, have invented a new and useful Pulley Attachment for Wheels, of which the following is a specification.

This invention relates to an improvement in attachments for automobile wheels, and the object is to provide a pulley which can be removably connected to a rear or drive wheel of an automobile so that upon the raising of the wheel from the ground power can be taken from the drive wheel for the purpose of transmitting power to a grinding machine, pump, saw mill, sewing machine, washing machine and the like.

Another object of the invention is in the manner of mounting the pulley upon the drive wheel which is accomplished by attaching clips or clamps to rotatable spokes of the pulley whereby upon the rotation of the pulley spokes the clamps will be brought into engagement with the rim of the drive wheel.

The invention consists of certain novel features of construction and combination of parts which will be hereinafter described in the following claims.

It is to be understood that many slight changes may be made in form and arrangement of the several parts described without departing from the spirit and scope of the invention, and hence I do not wish to limit myself to the exact disclosure herein set forth.

In the drawings,—Figure 1 is a view in elevation of a machine or automobile, showing the invention applied. Fig. 2 is a vertical sectional view through an automobile wheel and fully disclosing the invention. Fig. 3 is a view in side elevation of the pulley. Fig. 4 is a top plan view of the clamp and Fig. 5 is a perspective view of the clamp which is applied to the spokes of the drive wheel.

A represents an automobile.

1 is the front wheel, which is mounted in an anchor lock 2 for holding the wheel against movement. The rear or drive wheel 3 is supported above the ground by a jack 4. A pulley 5 of any approved form is provided with a plurality of spokes 6. Connected to the inner ends of diametrically opposite spokes is a hub or bearing 7 which is provided with an opening or recess 8.

The outer terminals of the several spokes are provided with screw threads 9, and the spokes are connected to the rim 10 of the pulley by means of plates 11 which are provided with openings in which the ends of the spokes are received. The plates 11 are connected to the rim of the pulley by means of bolts and nuts 12 and 13. Suitable clamps are mounted upon the spokes 6 which consist of sections 14 and 15. The two sections are provided with grooves 16 so that when the two sections are brought together a groove or circular opening is formed in which the spoke 17 of the wheel 3 may be received. The hole is preferably of a size to permit the free sliding movement of the sections or clamp upon the spoke, and the wall of the opening is covered with some material, such as felt or rubber to prevent the injury or removal of the paint and varnish on the spokes.

The section 14 of the clamp is provided with a right angular portion 18 which has a head 19 connected thereto provided with a central screw-threaded bore. The spokes 6 are received in the bore of the head 19 and the screw threads 9 of the spokes engage the screw threads of the head, so that the clamp is moved vertically of the spokes 6 of the pulley, and the spokes 17 of the wheel 3 for causing the jaws 20 of the sections 14 and 15 to be brought into engagement with the rim 21 of the wheel 3, a jaw of each section being received on opposite sides of the rim.

A lip or flange 22 is formed on the section 15 and a bolt 23 passes through the flange or lip for connecting sections 14 and 15 together. A nut 24 is screwed upon the bolt 23 for confining the two sections together.

When it is desired to apply a clamp to the rim or felly of a wheel the spokes 6 are rotated by inserting a tool in the opening or recess 8 of the hub 7, which causes, upon the rotation of the hub, the spokes to revolve and moves the clamps vertically and brings the jaws 20 into or out of engagement with the rim or felly 21.

When the sections 14 and 15 of the clamp have been elevated upon the spokes 6 sufficiently to cause the proper engagement between the clamp and the rim 21 of the wheel 3, the locking nut 30 on the spokes 6 will be screwed into engagement with the head 19 of the clamp for locking the clamp against movement and thereby maintaining the clamp in engagement with the rims 21 of the wheel 3.

In some instances the opening formed in the clamp by the groove 16 may not be of sufficient size to permit of a free sliding movement on the spokes, and in such instance the bolt 23 would be loosened sufficiently so that the clamp may be moved and after the clamp has been brought into position the bolt 23 will be tightened for holding the two sections rigidly upon the spoke. When it is desired to remove the spokes 6 from the pulley the plates 12 are disconnected and the spokes can then be removed or inserted.

As illustrated in Fig. 1, power can be taken from the pulley 5 by a belt 26 for transmitting the power to the pulley 27 and shaft 28 for the purpose of delivering the power to any suitable machine or apparatus from the shaft 28. Power may be taken from both of the rear drive wheels of an automobile by applying pulleys 5 thereto. It has been found that greater power can be obtained when a pulley is applied to each wheel.

What is claimed is—

1. The combination with a drive wheel consisting of a rim having spokes, of a pulley, clamps carried by the pulley adapted to engage the rim, and slidably mounted upon the spokes of the drive wheel, and means for moving the clamps into engagement with the rim of the drive wheel.

2. The combination with a drive wheel, of a pulley consisting of a rim and spokes, clamps movably mounted on said spokes adapted to engage a drive wheel, and means for causing the clamps to be brought into engagement with the drive wheel for fastening the pulley thereto.

3. The combniation of a drive wheel, a pulley having rotatable spokes, clamps mounted upon the spokes, and means for rotating the spokes for causing the clamps to be brought into engagement with the drive wheel for fastening the pulley to the wheel.

4. The combination with a drive wheel, of a pulley having rotatable spokes, clamps having screw threaded engagement with the spokes, and means for rotating the spokes for causing the clamps to engage the drive wheel and lock the pulley thereto.

5. The combination with a drive wheel consisting of a rim and spokes, of a pulley provided with rotatable spokes, a clamp made of two sections adapted to be placed upon a spoke of the drive wheel, means for connecting the two sections together, jaws on the sections adapted to be brought into engagement with the rim of the drive wheel, and means for connecting the sections to the spokes of the pulley whereby upon the rotation of said spokes the clamp will be brought into engagement with the rim of the drive wheel.

6. The combination of a rim, rotatable spokes, means for connecting the spokes to the rim, and clamps carried by said spokes adapted to be moved vertically upon the rotation of said spokes.

7. The combination with a drive wheel consisting of a rim having spokes, of a pulley arranged alongside the drive wheel, and clamping devices carried by the pulley and provided with jaws to engage the rim of the drive wheel.

8. The combination with a drive wheel consisting of a rim having spokes, of a pulley also having a rim and spokes, and clamping devices mounted upon and connecting the spokes of the pulley and wheel and provided with jaws to engage the rim of the drive wheel.

In testimony that I claim the foregoing as my own, I have hereto affixed my signature in the presence of two witnesses.

JACOB SCHROCK BAUGHMAN.

Witnesses:
 CHAS. C. CLAUS,
 MARY R. BALL.